United States Patent [19]

Weber

[11] 4,360,297
[45] Nov. 23, 1982

[54] CUTTING INSERT

[75] Inventor: James H. Weber, El Toro, Calif.

[73] Assignee: Kennametal Inc., Latrobe, Pa.

[21] Appl. No.: 299,609

[22] Filed: Sep. 4, 1981

Related U.S. Application Data

[63] Continuation of Ser. No. 93,665, Nov. 13, 1979, abandoned, which is a continuation of Ser. No. 911,911, Jun. 2, 1978, abandoned.

[51] Int. Cl.³ .......................... B23P 15/28; B23G 1/00
[52] U.S. Cl. ..................................... 407/113; 82/36 R
[58] Field of Search ................ 10/101, 102; 82/36 R; 407/103, 104, 107, 111, 112, 113, 114

[56] References Cited

U.S. PATENT DOCUMENTS

| 3,399,442 | 2/1968 | Jones et al. | 407/114 |
| 3,557,416 | 1/1971 | Jones | 407/114 |
| 3,754,309 | 8/1973 | Jones et al. | 407/113 X |
| 3,762,005 | 10/1973 | Erkfritz | 407/113 |

FOREIGN PATENT DOCUMENTS

| 672039 | 5/1952 | United Kingdom | 407/113 |
| 1363542 | 8/1974 | United Kingdom | . |

Primary Examiner—Ervin M. Combs
Attorney, Agent, or Firm—Lawrence R. Burns

[57] ABSTRACT

An improved indexable cutting insert and tool holder for threading operations comprises an insert having end wall regions and parallel sides and parallel top and bottom walls perpendicular to said sides. The insert is invertable about the axis perpendicular to its sides and is adapted for mounting in the pocket of a tool holder with one end region exposed. A recess is formed in at least one of the top and bottom walls along the outer edges with an outer region forming cutting edges at its juncture with the end wall region. The recess also has an inner region in the form of an abrupt rise leading from the lowermost part of the outer region upwardly to the plane of the top or bottom wall. The cutting edges are angled so that when the insert is placed in a negative rake holder the cutting edges can be presented at zero or positive rake to the workpiece.

2 Claims, 8 Drawing Figures

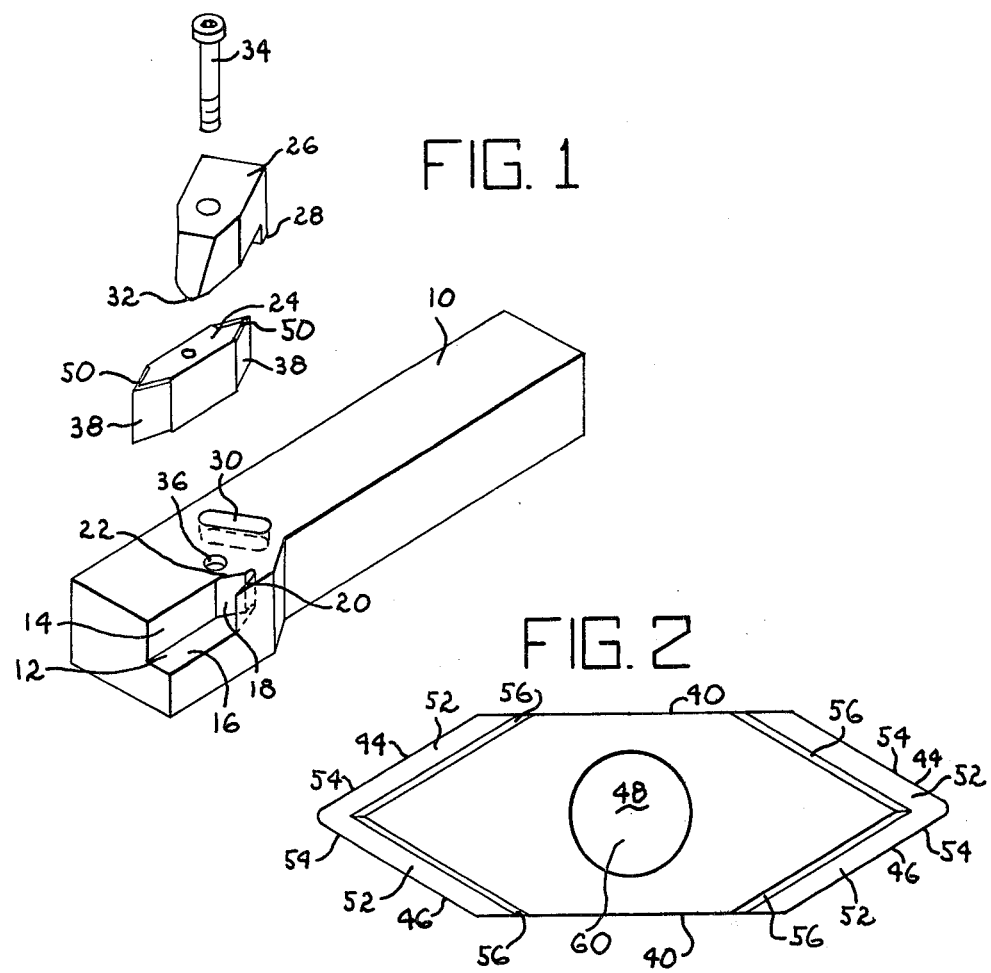
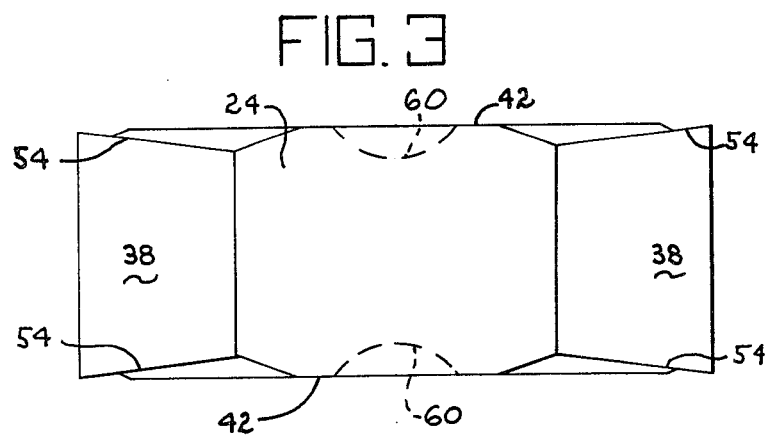

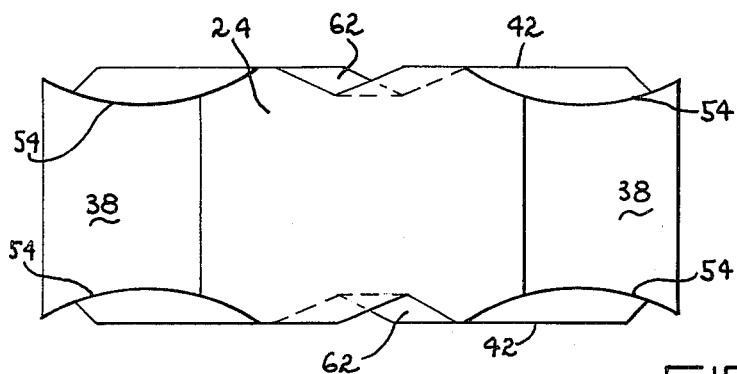
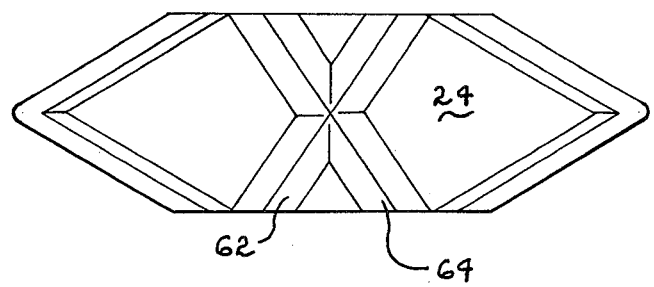
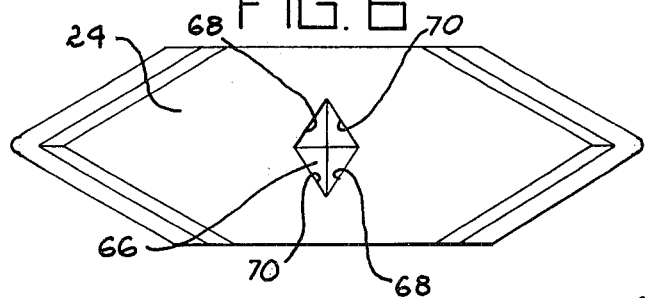
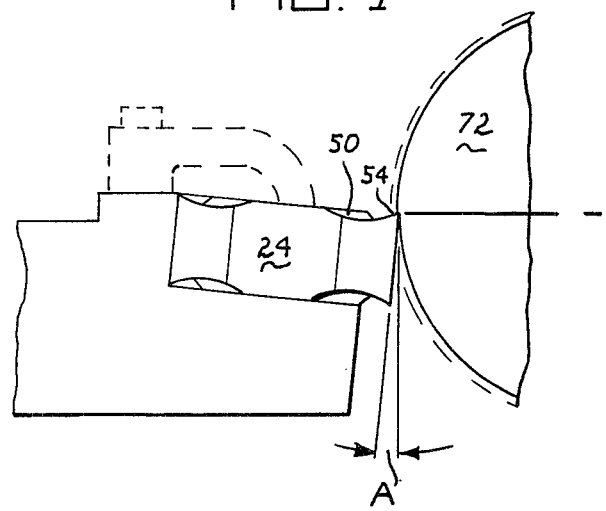
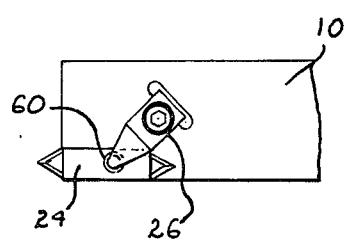

CUTTING INSERT

This is a continuation of application Ser. No. 093,665, filed on Nov. 13, 1979, abandoned which was in turn a continuation of Ser. No. 911,911 filed June 2, 1978, abandoned.

BACKGROUND OF THE INVENTION

This invention relates to indexable threading inserts for use in metalworking, and particularly to an indexable threading insert that may be mounted in a negative rake holder and yet have the insert cutting edges presented to the workpiece at a zero or positive rake angle.

Further, in the particular threading insert embodied by the present invention, a specific chip breaker groove is used with a threading insert.

Indexable threading and grooving inserts are known and find a wide variety of use throughout the metalworking industry. Indexable inserts for threading and grooving and the tool holder that receives such inserts should be designed so that the insert is accurately located and rigidly held on the tool holder when performing any work.

The inserts must usually be small and narrow in width and have a portion that overhangs the tool holder to do the threading. Under these condition, ideal arrangements for such inserts and tool holders are constantly being sought. While various types of threading and grooving combinations are known, one successful arrangement for such an insert and tool holder is described in applicant's own U.S. Pat. No. 3,754,309. Indexable inserts described by the patent have been in the market for several years, have enjoyed success in the marketplace and have become known by most people in the metalworking industry, specifically in the threading and grooving area. The cutting edges of the inserts can taken on various complex forms for threading operations while, also, being capable of taking a simple form for grooving operations.

Another type of indexable insert on the market, which is usually used for turning, boring and profiling work, but not for threading and grooving operations, is described by applicant's U.S. Pat. No. 3,399,442. These inserts describe an insert that can be used in a negative rake tool holder and yet present positive rake cutting edges to the workpiece. In some instances, as described by the patent, positive rake cutting conditions are preferable to negative rake cutting conditions.

Indexable inserts should, by their very nature, have as many cutting edges on the insert body as is possible. The threading and grooving indexable inserts described above have only two cutting regions on the body of the insert. It is proposed by this application to make an indexable threading insert similar to the threading and grooving inserts described above, but the threading insert body will have four cutting regions instead of only two cutting regions as was previously possible.

BRIEF SUMMARY OF THE INVENTION

According to the present invention, a threading insert and tool holder are presented with the insert having parallel sides and parallel top and bottom walls perpendicular to the sides. The insert has end wall regions for cutting, with the insert being invertable about an axis perpendicular to the sides and adapted for mounting in a pocket of a holder with one end region exposed.

The end wall regions comprise at least two end walls that converge toward one another as they extend from the center portion of the insert, and a recess means is formed on at least one of said top and bottom walls. The recess means has an outer region that extends along the outer edge of said top or bottom wall and cutting edges are formed at the juncture of said outer region with the convergent end walls.

The recess means also includes an inner region in the form of an abrupt rise leading from the lowermost part of the outer region upwardly to the plane of one of said top and bottom walls, the cutting edges defining a plane that forms an acute included angle with the plane of either the top or bottom walls.

A clamping notch is formed in either one or both of the top and bottom walls of the insert. Preferably, the notch is a diagonal groove extending between the parallel sides of the insert. The notch may comprise, however, a circular depression near a center portion of either one of the top or bottom walls.

The insert is received in an insert receiving pocket of a tool holder accordinfg to the present invention. The insert receiving pocket has an end wall area, a side wall and a bottom wall, and is open on the other three sides. The end wall area of the pocket comprises two opposing walls extending at substantially right angles to the bottom wall of the pocket. The opposing walls converge toward one another, preferably with the opposing wall opposite the side wall of the insert converging toward the plane of the side wall.

A top clamp member on the tool holder is provided for holding the insert in the pocket. Preferably, the clamp member extends angularly to the length of the insert and, when engaged with the notch in the insert, pulls the insert together against the back, bottom and opposing wall of the tool holder pocket. If the notch in the insert is similar to a circular depression, then the clamp member may extend over the longitudinal length of the insert, thereby eliminating the need to use either a righthand or lefthand insert.

The exact nature of the present invention will become more clearly apparent upon reference to the following detailed specification taken in connection with the accompanying drawings in which:

BRIEF DESCRIPTION OF THE DRAWINGS

FIG. 1 is a perspective view of a tool holder and insert according to the present invention.

FIG. 2 is a top view of an insert according to the present invention.

FIG. 3 is a side view of an insert according to the present invention.

FIG. 4 is a side view of an insert with a diagonal notch according to the present invention.

FIG. 5 is a top view of an insert with a diagonal notch according to the present invention.

FIG. 6 is a top view of a cutting insert with a modified central depression in the insert.

FIG. 7 is an insert and tool holder according to the present invention being presented to a workpiece so that near zero rake is presented to the workpiece and yet clearance is provided for the additional cutting edges on the insert.

FIG. 8 is a top view of the tool holder and insert.

DETAILED DESCRIPTION OF THE INVENTION

Referring to the drawings somewhat more in detail, what is shown in FIG. 1 is a tool holder 10 having an insert receiving pocket 12 at its forward end. The insert receiving pocket 12 has a side wall 14, bottom wall 16 and end wall area 18, and is open on the other three sides. The end wall area 18 has opposing walls 20 and 22 that converge toward one another as they extend away from the front end of the tool holder.

Preferably, the opposing wall 20 which is opposite side wall 14 converges toward the plane of side wall 14. Cutting insert 24 is shown and is adapted to be received in pocket 12 of tool holder 10.

Clamp member 26 is shown and has a leg 28 which is adapted to be received in a slot 30 formed in the top of the tool holder 10. Clamp member 26 has a rounded nose portion 32 which engages the top of insert 24. A clamp screw 34 extends through a hole in the clamp member 28 and into a threaded hole 36 provided in the top of tool holder 10. The insert 24 has end wall regions 38 as shown in FIG. 1 and parallel side walls 40 as shown in FIG. 2.

Shown in FIG. 3, the insert also has parallel top and bottom walls 42 perpendicular to the side walls 40 and the insert is invertable about an axis perpendicular to the side walls 40. The insert 24 sits in pocket 12 and has one end region exposed for cutting a thread in a workpiece, and the clamp member holds the insert against side wall 14, bottom wall 16 and opposing wall 20.

End regions 38 of the cutting insert 24 comprise at least two end walls 44 and 46 which converge toward one another as they extend from the center portion of the insert indicated at 48. A recess means 50 is formed on at least one of either the top or bottom walls, preferably both.

The recess means 50 comprises an outer region 52 that extends along the outer edge of the top or bottom wall and cutting edges 54 are formed at the junctures of the outer region 52 with the convergent end walls 44 and 46. The recess means 50 also includes an inner region 56 in the form of an abrupt rise that leads from the lowermost part of the outer region 52 upwardly to the plane of one of the top or bottom walls and extends substantially parallel to said converging end walls 44 and 46 when viewed in top view as shown in FIG. 2, and intersects side walls 40.

In FIG. 3, the cutting edges 54 are shown on both end regions 38 of the cutting insert 24. The cutting edges 54 being on both end walls 44 and 46 effectively define a plane that forms an acute included angle to the plane of the corresponding top or bottom wall. The angle is preferably small and preferably anywhere from 5 to 7 degrees, depending upon the type of holder in which the insert will be seated.

Shown in FIG. 2, the insert 24 has a rounded center portion 48, a circular depression 60 which receives nose portion 32 of a clamp member 26. The central depression 60 is shown in FIG. 3.

Referring now to FIG. 4, what is shown therein is, again, cutting edges 54 on end regions 38 of cutting insert 24. The cutting edges 54 are slightly modified from those of FIG. 3. The cutting edges 54 are shown being curved; however, they still would effectively define a plane that would form an acute included angle with a plane of a corresponding top or bottom wall 42.

Shown extending from side wall to side wall in top or bottom wall 42 is diagonal notch 62 which can also receive nose portion 32 of clamp member 26. A diagonal notch 62 is used to hold the insert 24 in the pocket 12. The clamp member must be angled to the direction of pocket 12 so as to urge the insert against the three walls.

When, as shown in FIG. 2, the central depression 60 is urged, the clamp member 26 may be aligned such that the slot 30 is behind the end wall area 20 of pocket 12 and the insert will then be held against four walls of the pocket, the four walls being side wall 14, the bottom wall 16 and opposing walls 20 and 22. When done in this manner, the insert may then be used in either righthand or lefthand tool holders for threading operations.

Shown in FIG. 5, is an insert 24 having two diagonal grooves 62 and 64 extending across one wall 42 of the insert so that the insert can also be used in a righthand or lefthand tool holder.

Shown in FIG. 6 is an insert 24, again, having a central depressed portion 66 which is noncircular and has angled side walls 68 and 70 forming a parallelogram such that a nose 32 of clamp member 26 will engage the depressed portion and hold the insert 24 in tool holder 10.

Referring to FIG. 8, as shown therein is tool holder 10 having an insert, as shown in FIG. 2, that utilizes a central depression 60 to accept the nose 32 of the clamp member 26. Insert 24 is thus held in the tool holder by the four walls mentioned above.

Referring to FIG. 7, a workpiece 72 is being threaded by a cutting insert 24 according to the present invention. End region 38 is part of a peripheral surface of the insert 24 and is provided with a front clearance angle A from the surface of the workpiece being cut. This angle A may be from 5 to 10 degrees, depending upon the particular material and depth of cut being taken and other factors.

The insert has a recess means 50 in the upper face extending along the outer edge of the top or bottom wall and cutting edges 54 are formed at the juncture of the walls of the end region and the recess means.

The plane defined by the cutting edges 54 is angled to the plane of one of the respective top or bottom wall and is a small, acute included angle. This provision allows the cutting edges to be presented to the workpiece at substantially zero degrees rake, even though the insert may be sitting in a negative rake tool holder.

Modifications may be made within the scope of the appended claims.

What is claimed is:

1. A threading insert having end wall regions and parallel sides and parallel top and bottom walls perpendicular to said sides, said insert being invertable about an axis perpendicular to said sides and adapted for mounting in a pocket in a holder with one end region exposed, said end wall regions comprising at least two end walls that converge toward one another as they extend from the center of the insert with the lines of intersection of said converging walls perpendicular to said top and bottom walls and recess means comprising an outer region that extends along the outer edge of one of said top and bottom walls and intersects said side walls, cutting edges formed at the juncture of said outer region with said convergent end walls, said recess means also including an inner region in the form of an abrupt rise extending substantially parallel to said converging end walls when viewed in top view leading from the lowermost part of said outer region upwardly to the plane of said one of said top and bottom walls and intersecting said side walls, said cutting edges effectively defining a plane that forms an acute included angle with the plane of said one of said top and bottom walls, said cutting edge plane inclined downwardly toward the center of the insert, and a clamping notch formed in said one of said top and bottom faces for clamping said insert in the pocket.

2. A cutting insert according to claim 1 in which said notch in said insert is a diagonal notch formed in each of said top and bottom walls of said insert and extends thereacross at an angle such that each notch, when uppermost, forms substantially the same acute angle with said sides of said insert.

* * * * *